UNITED STATES PATENT OFFICE.

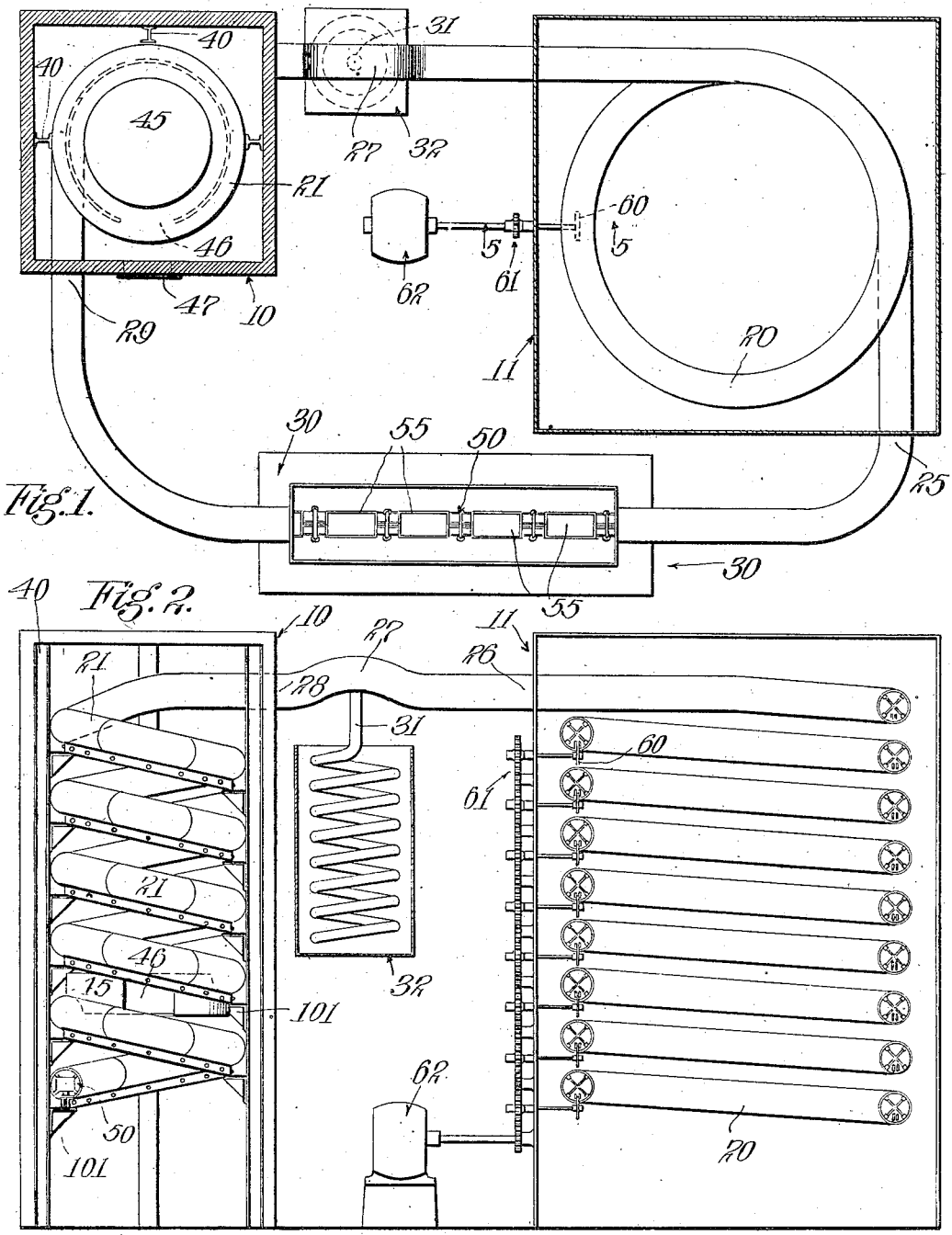

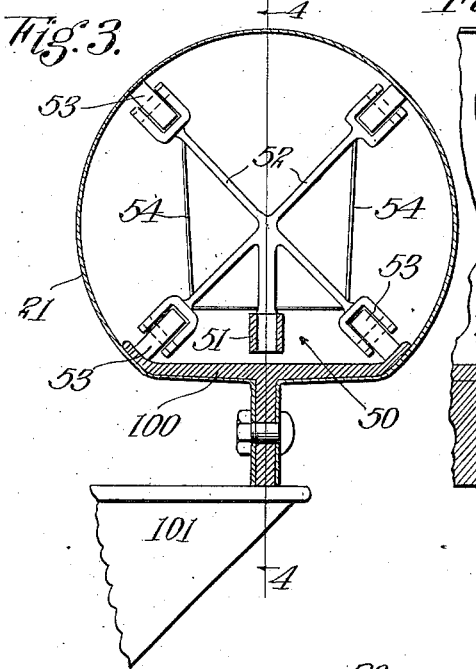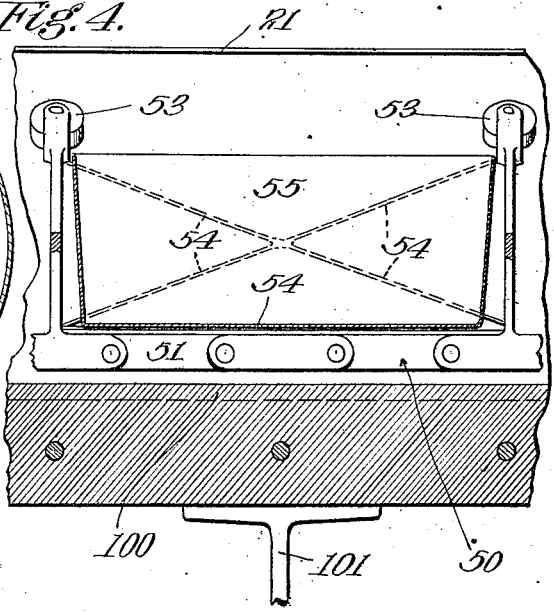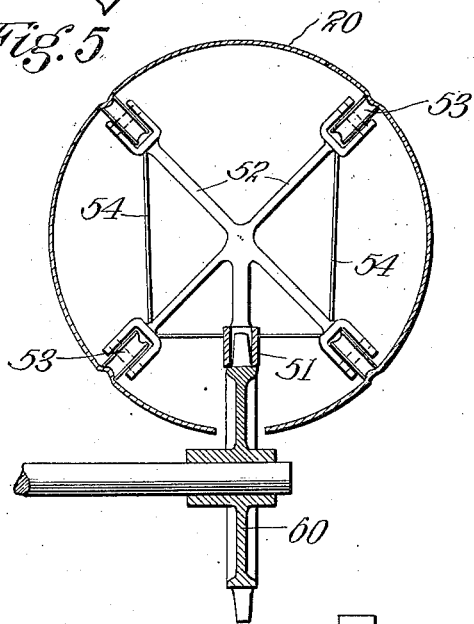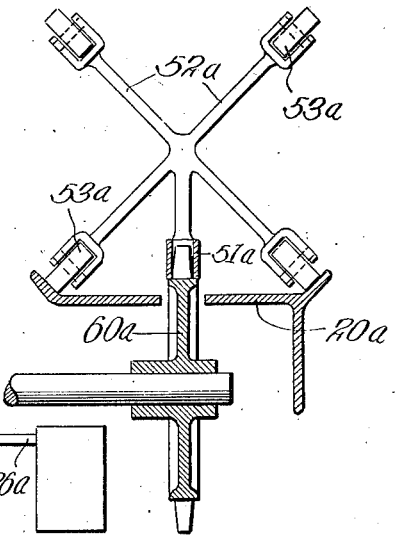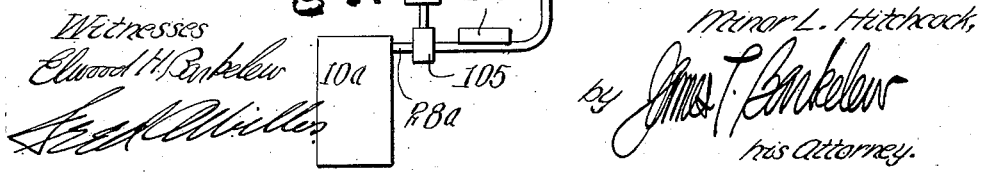

MINOR L. HITCHCOCK, OF LOS ANGELES, CALIFORNIA.

BAKING DEVICE.

1,073,126.  Specification of Letters Patent.  Patented Sept. 16, 1913.

Application filed January 23, 1912. Serial No. 672,840.

*To all whom it may concern:*

Be it known that I, MINOR L. HITCHCOCK, a citizen of the United States, residing at Los Angeles, in the county of Los Angeles, State of California, have invented new and useful Improvements in Baking Devices, of which the following is a specification.

This invention relates to a combination of devices whereby continuous baking operations may be carried on and certain carbo-hydrates, driven off from the baking products, may be saved as a commercially valuable by-product; and whereby the bread or other food is cooked in its own vapors.

It is well known that during the process of baking bread and the like a certain volume of vapor containing carbo-hydrates escapes from the bread and ordinarily is lost in the atmosphere. My invention provides means for collecting and liquefying these carbo-hydrates, largely alcohol, and thereby provides for a large saving in the baking process.

In combination with the mechanism for saving alcohol, I have designed a special form of proof room and oven which not only facilitates the collection of the alcohol vapors but also renders possible the continuous carrying on of the operation of baking and of preparation therefor.

As practically carried out in a preferred specific form, my invention consists of an oven having separate baking and firing compartments, and a vapor condenser so arranged that the vapors thrown off from the baking articles are caught and condensed after having formed an atmosphere for the baking bread; and in the combination with a proof room connected with the baking compartment of the oven in such manner that the baking products may be moved continuously through the proof room and directly into the oven. Specifically, this all takes the form of a tube or track spiraling through the proof room and then through the oven, having a vapor collector where it passes the oven and proof room, and a means for continuously moving bread or the like through the tube or over the track.

In the accompanying drawings I have illustrated a typical form of my improved device, in which drawings—

Figure 1 is a sectional plan view of my invention. Fig. 2 is a vertical section of the same. Fig. 3 is a detail section, being an enlargement of a portion of Fig. 2. Fig. 4 is a section taken on line 4—4 of Fig. 3. Fig. 5 is a section taken on line 5—5 of Fig. 1. Fig. 6 is a section similar to that of Fig. 5 showing a modified form of track in the proof room. Fig. 7 is a section showing a modified passage of the tube between the proof room and oven and illustrating another possible arrangement of the portions of my complete device.

In the drawings 10 designates an oven structure and 11 a proof room. The oven structure may be made of any heat retaining material while the proof room may be conveniently constructed of sheet metal. Within the proof room and the oven structure are spiral coils of tubing formed of suitable non-absorbent material. The spiral coils 20 within the proof room contain a length of tubing much greater than the spiral coil 21 in the oven structure. The tubing of which these spiral coils are formed is preferably of thin sheet metal, no great strength being required. The tubing first enters the proof room at its lower end, as at 25, spirals up through the proof room and then out at its upper end as at 26, crosses the intervening space to the oven structure at 27, enters the oven structure at 28 and spirals down through the structure as illustrated. It leaves the oven structure at 29 and passes to a suitable table or machine 30 where the various operations of discharging and charging takes place as hereinafter described. At the point where the tube passes between the proof room and the oven it is raised as illustrated at the point 27 and a tube 31 connects with this raised portion of the tube at 27, the tube 31 leading to a vapor still 32 or to a condenser of any desired character. The ends of the tube each connect with this table or mechanism 30, the tube and the mechanism forming a continuous and endless passage or track for a continuous chain conveyer mechanism about to be described.

The spiral within the oven structure travels down at a comparatively steep angle, so that the number of coils in the oven is less than the number in the proof room. The diameter of the oven spiral is also less than that of the proof room so that the total length of tube contained in the proof room is much greater than that in the oven. The spirals may be supported in any desired manner; and I have shown a typical form of support within the oven consisting of uprights 40 upon which the spiral is supported in any suitable manner. In the lower part of the spiral I have shown a small auxiliary oven 45 of a suitable diameter to be contained within the coils and having height about equal to the distance between coils. This oven has an opening 46 through which cakes, pies and the like may be placed therein, and a door 47 is provided on the oven structure or access to the opening 46. The provision of this small auxiliary oven adapts my device to the continuous baking of bread and also to the baking of all pastries and the like.

The tube forming the spirals in the proof room and the oven structure forms a track within which a continuous chain conveyer 50 is adapted to travel. This continuous chain conveyer is preferably composed of a continuous chain 51 which carries at intervals suitable frames 52 upon which rollers or guide wheels 53 are mounted to guide the conveyer through the tubes. Between adjacent frames 52 there are arranged suitable members 54 which serve to inclose a space in which a bread pan 55 may be placed. The number of bread pans which may be accommodated will depend entirely upon their size and the total length of the conveyer. The conveyer is endless and proceeds through the entire length of the tube forming the spirals and proceeds across the charging and discharging table 30 as is clearly shown in Fig. 1. Movement of the conveyer is caused by means of sprocket wheels 60 which project up through the bottoms of the individual coils of spiral 20 and engage with the chain 51 to drive it upwardly along the spiral. These sprocket wheels are driven by suitable gearing arrangements 61 on the outside of the proof room, the power being preferably supplied by motor 62. The chain conveyer with its accompanying pans of bread passes slowly up through the spiral 20 in the proof room, a sufficient length of time elapsing while the bread is within the proof room to allow it to expand in the well known manner. Upon passing from the proof room the bread on the conveyer passes through the portions of the tube between the proof room and the oven and thence into the spiral in the oven. The spiral in the oven becomes in effect the baking chamber of the oven entirely separate and sealed from the spiraling chamber below and around it. The spaced relation of the coils of this spiral allow the tubes and the bread therein to be uniformly heated and also obviates the necessity of providing any driving means for the conveyer chains in the spiral. The spiral travels downwardly at a sufficient angle to cause the conveyer chain and the bread to travel without the necessity of being driven. When the operation of the device is first started and the first loaf of bread passes into the baking spiral, the steam and other vapors therefrom will pass upwardly along the spiral and the loaf of bread moving downwardly will leave the vapors and will consequently not be baked therein. Subsequent loaves, however, will be properly baked in the rising steam and other vapors of the loaves preceding them. As soon as the operation is fully under way the baked loaves of bread begin to come down through the spiral and out to the table 30 where they are discharged from the conveyer in any suitable manner. This may be done by hand, as also the charging of the pans with fresh dough; or both operations may be accomplished by automatic machinery.

As the baking of the loaves progresses, each loaf gives off its quota of vapors which pass upwardly through the tube to the point 27, and thence are drawn to the condenser or still. The vacuum created in the still by condensation of the vapors therein will usually be sufficient to draw the vapors through the tube of the spiral; if any heavier suction is desired it is possible to utilize a vacuum pump for drawing the vapor products out of the tube.

As no heat is applied to the proof room, it is not necessary to continue the tube therethrough to form an inclosed space for the rising bread; it is sufficient to provide a suitable track such as shown in Fig. 6, provided that the proof room is suitably constructed to keep out foreign matter (dirt, dust, gases, etc.). Thus the apparatus takes the form of a suitable continuous track, the portion of the track in the oven forming an inclosed chamber.

In Fig. 6 I have shown a track 20 for the passage of the chain conveyer.

In Fig. 5 I have shown in detail the construction of the proof room tube as illustrated in Fig. 2.

In Figs. 3 and 4 I have shown a preferred construction of track and inclosing tube 21 in the oven. Here the tube 21 surrounds the track 100, the track resting on suitable supports 101. The tube may be in sections, as indicated in Fig. 2, so as to be removable for inspection and repairs.

In Fig. 7 is shown a modified arrangement of parts with the proof room 11ª as placed on an upper floor, the still 32ª as on a middle floor, and the oven 10ª on a lower floor. A vapor collector box 105 is shown in lieu of the trap shown in Fig. 2, and an opening 106 is illustrated for charging the conveyer chain near the oven to bake bread without using the proof room.

It will thus be seen that my invention consists in such arrangements and combinations that I am enabled to bake bread or other foods in a continuous process and under absolutely sanitary and economical conditions. The loaves are not handled by hand from the time they are formed of dough to the time they are completely baked; each loaf is given exactly the same time for preparation and for baking as its fellows; and my saving of the alcoholic by-products enables me to greatly decrease the expense of bread baking.

The essentials of my mechanical arrangement may be seen from the foregoing to consist primarily in a suitable oven structure having a downwardly inclined baking compartment through which the bread passes and up which the vapors rise.

By the use of the spiral tube the bread may be kept in constant motion through the oven and by regulating the speed of the carrier chain the movement of the bread in the oven may be varied at will. The spiral tube in the proof room being connected with the spiral tube in the oven, the heat in the baking tube is conducted to the dough in the proof room, and the tempering of the bread is consequently facilitated. The continuous tube arrangement also serves to confine the vapors generated during the baking operation, the air in the proofing tube being heavier than the hotter air in the baking tube provides a barrier to the flow of the vapors through the proofing tube, and the condensation of the vapors in the condensing tube is consequently promoted. A further material advantage of the above tube and carrier arrangement is that the same carrier serves to maintain the bread in motion through the proofing tube and the baking tube. The steeper turns of the baking tube provides for an effective fall under gravity attraction, which serves to reduce the load moved in the proofing tube, the turns of which are but slightly inclined, thereby enabling the easy lifting of the dough through the proofing tube.

Having described my invention, I claim:

1. The combination with an oven, of an endless baking tube extending through the oven and having a portion communicating therewith and constituting a proofing tube.

2. The combination with an oven, of an endless baking tube extending through said oven, a portion of said tube being located externally of said oven and constituting a proofing tube, said baking tube and said proofing tube having a common single entrance and exit.

3. The combination with an oven of a proofing tube communicating with the oven and adapted to conduct heat therefrom.

4. The combination with an oven, of a spiral baking tube in the oven and a spiral proofing tube exteriorly of the oven and communicating with the baking tube and having a greater number of turns than the turns of the baking tube, the spiral baking tube and the spiral proofing tube having a horizontal connection at their lower portions provided with a single opening.

5. In combination, an imperforate baking tube arranged in a spiral, a proofing tube connected with the baking tube and adapted to form a feed intake for the baking tube, a continuous carrier movable through the proofing tube and the baking tube, and a vapor condenser communicating with the tubes at the point of their union.

6. In combination, an oven, a spiral imperforate baking tube extending through the oven from the top to the bottom thereof, the upper portion of the baking tube being extended outwardly of the oven, a proofing tube connected with said extended portion and extending spirally downwardly therefrom and adapted to confine the pressure generated in said baking tube, the lower portions of the baking tube and the proofing being joined by a common single tube with an opening therein for entrance and exit.

7. In combination, an oven, a spiral imperforate baking tube extending through the oven from the top to the bottom thereof, the upper portion of the baking tube being extended outwardly of the oven, a proofing tube connected with said extended portion and extending spirally downwardly therefrom and adapted to confine the pressure generated in said baking tube, and a continuously working vapor condenser connected with the said extended portion of the baking tube.

8. In combination, an oven, an endless baking tube in the oven, an inclosed proofing compartment connected with the baking tube so as to maintain the pressure generated in the baking tube, an endless carrier movable through the baking tube and the proofing compartment, and means located between the baking tube and the proofing compartment to withdraw vapor from the baking tube.

In witness that I claim the foregoing I have hereunto subscribed my name this 13th day of January 1912.

MINOR L. HITCHCOCK.

Witnesses:
JAMES T. BARKELEW,
JAS. H. BALLAGH.

---

Copies of this patent may be obtained for five cents each, by addressing the "Commissioner of Patents, Washington, D. C."